United States Patent [19]

Lowenthal et al.

[11] Patent Number: 5,081,630
[45] Date of Patent: Jan. 14, 1992

[54] TUNABLE PULSED TITANIUM:SAPPHIRE LASER AND CONDITIONS FOR ITS OPERATION

[75] Inventors: Dennis D. Lowenthal, Redmond; Clifford H. Muller, Bellevue; Charles E. Hamilton, Kirkland; Dean R. Guyer; Kenneth W. Kangas, both of Bellevue, all of Wash.

[73] Assignee: Amoco Corporation, Chicago, Ill.

[21] Appl. No.: 414,886

[22] Filed: Sep. 29, 1989

Related U.S. Application Data

[63] Continuation-in-part of Ser. No. 214,419, Jul. 1, 1988, Pat. No. 4,901,322.

[51] Int. Cl.$^5$ ................................................ H01S 3/10
[52] U.S. Cl. ........................................ 372/20; 372/71; 372/102; 372/108
[58] Field of Search ...................... 372/20, 69, 70, 71, 372/92, 102, 108

[56] References Cited

U.S. PATENT DOCUMENTS 4,901,322 2/1990 Kangas ................................. 372/20

Primary Examiner—James W. Davie
Attorney, Agent, or Firm—Seed & Berry

[57] ABSTRACT

A laser system for producing pulsed, longitudinal mode optical energy over a widely tunable range of wavelengths. The system includes an optical cavity and a solid-state gain medium. The optical cavity comprises first, second, and third optical element means. The first optical element means reflects energy received along a first reflective optical axis and directs the energy toward the second optical element means, which diffracts the optical energy into at least two orders of interference. The energy diffracted according to a first order of interference is reflected back toward the second optical element means by a third optical element means, thereby creating a resonant optical cavity. Another portion of the optical energy diffracted by the second optical element means is produced as an output beam. The solid-state gain medium is located on the optical axis between the first and second optical element means and receives pump energy from a plurality of pump beams that are within two degrees of being colinear with the first reflective optical axis. The solid-state gain medium converts the pump beam energy to optical energy having a desired wavelength with a very high efficiency, without required pump beam energy densities above a predetermined level. The laser system is tunable by moving the third optical element means with respect to the second optical element means, thereby causing optical energy at a tunable wavelength to resonate within the optical cavity.

5 Claims, 7 Drawing Sheets

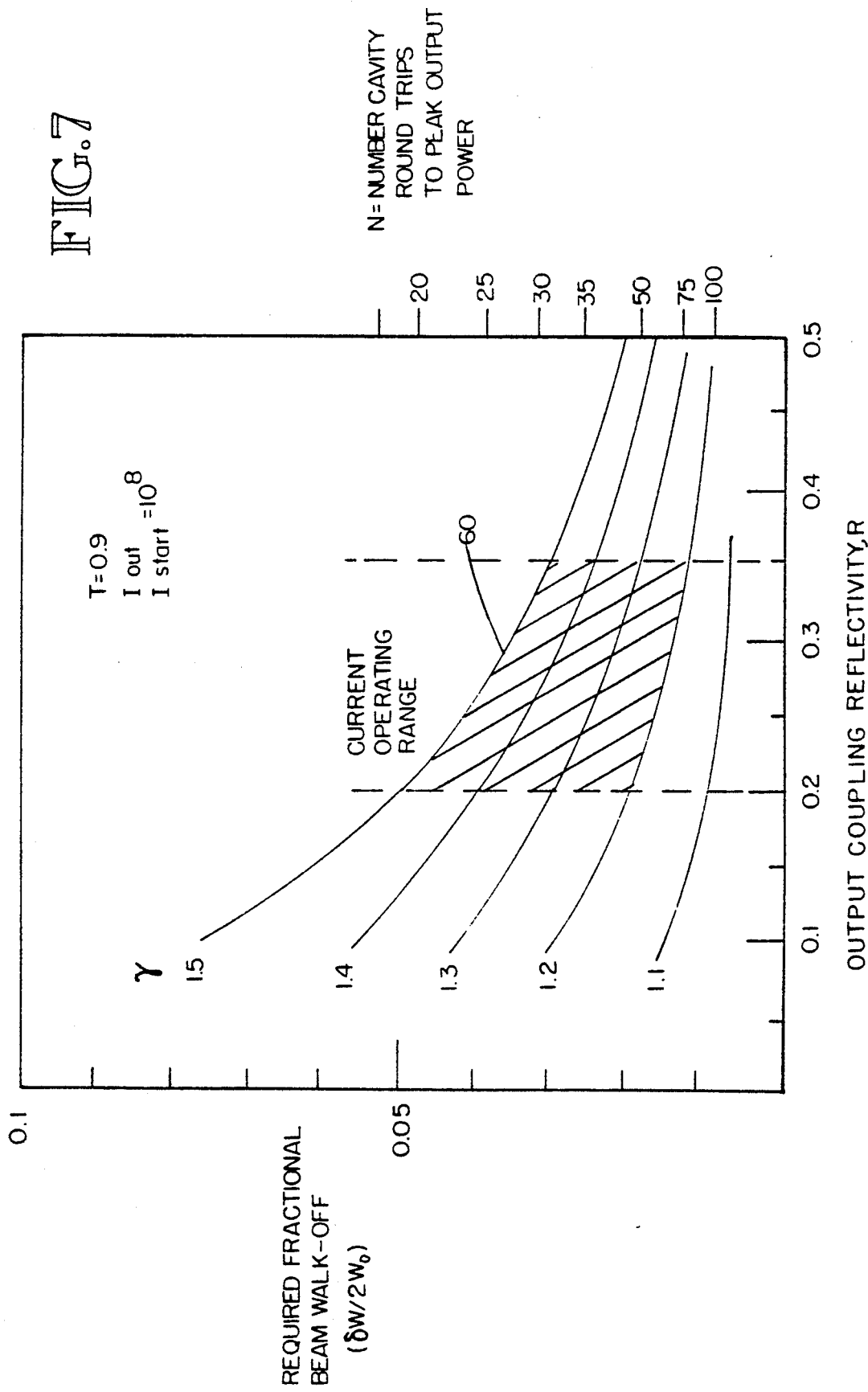

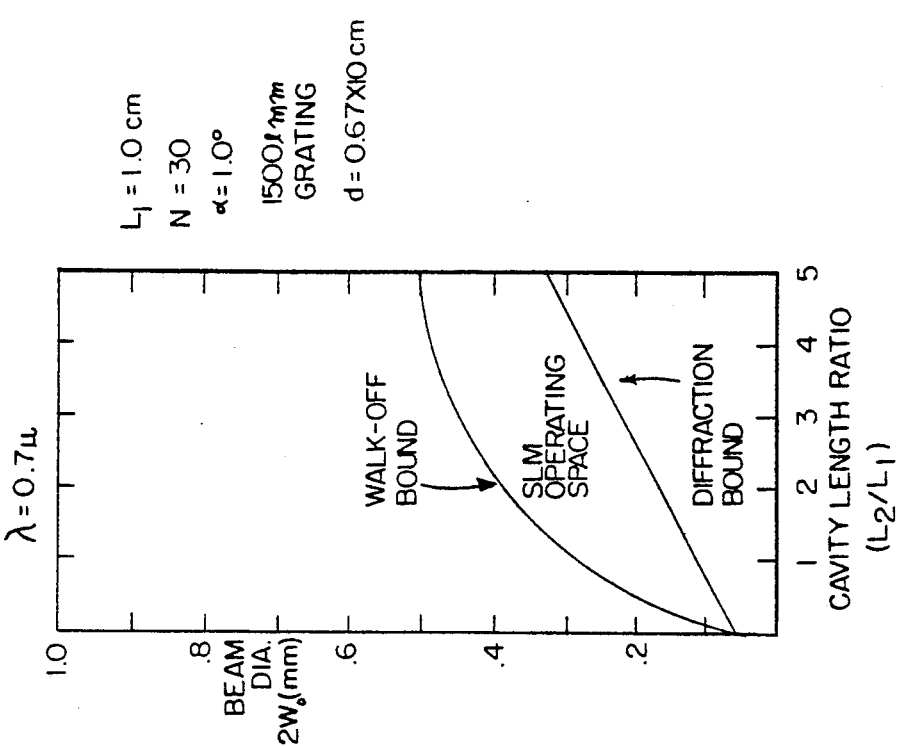
FIG. 8C
FIG. 8B
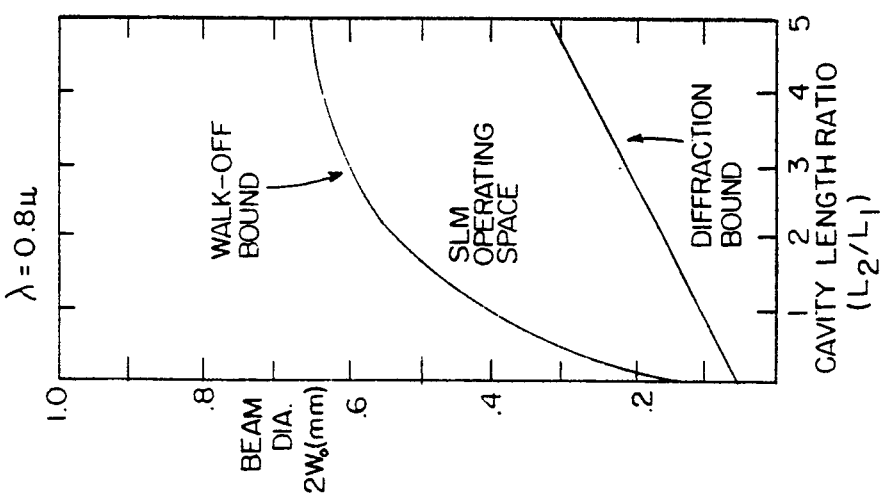
FIG. 8A
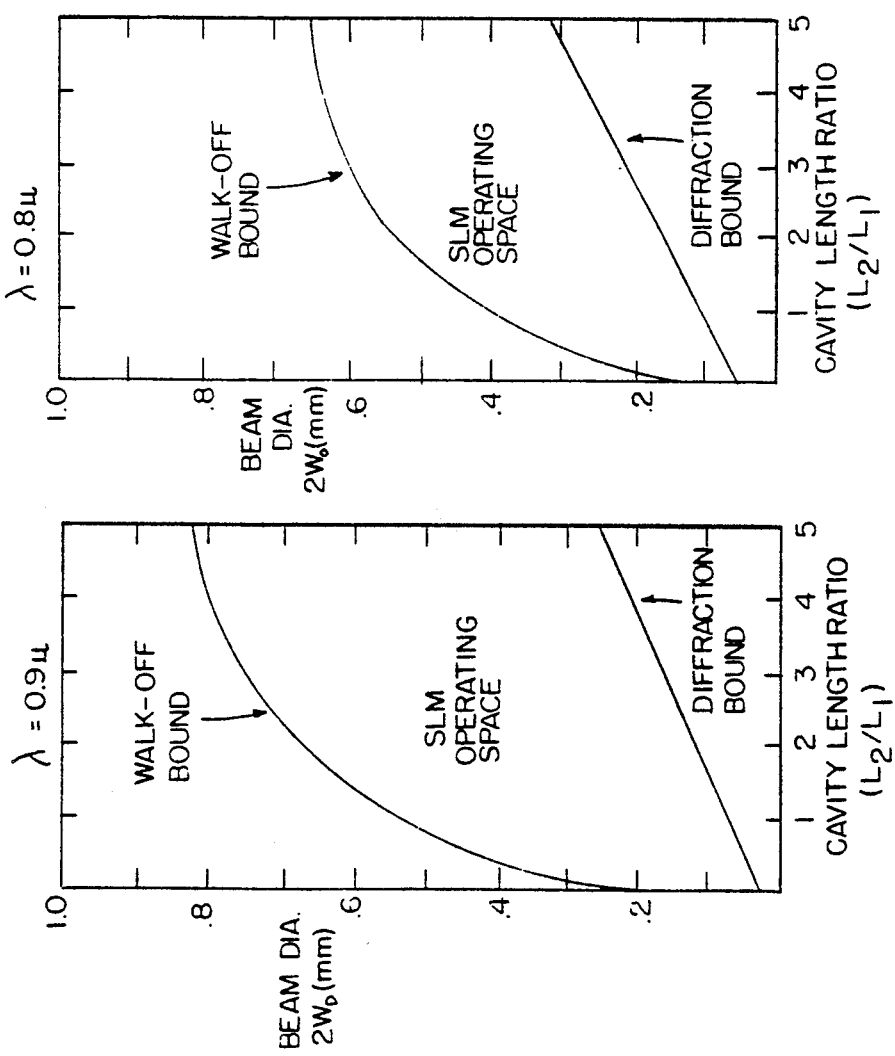

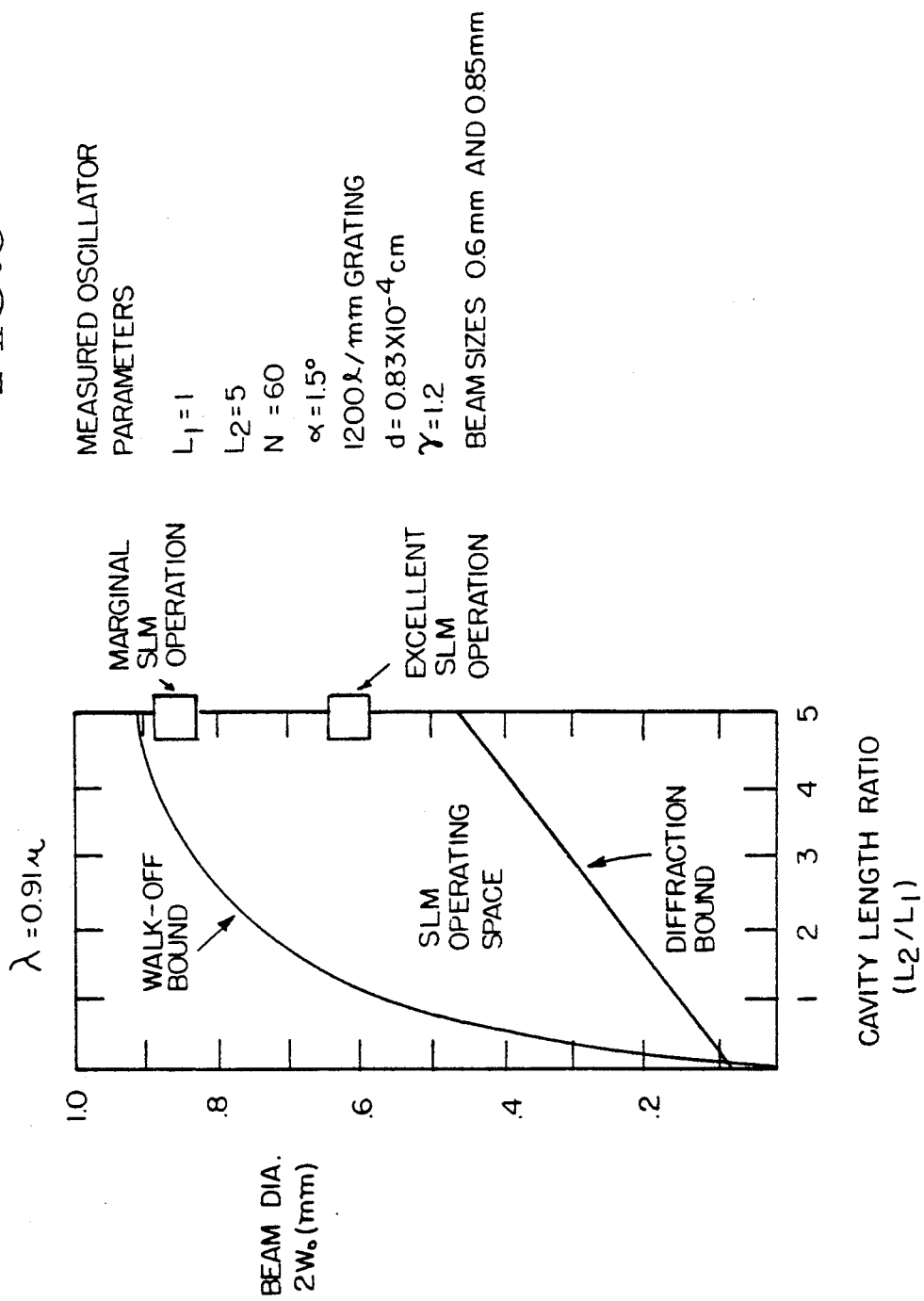

TUNABLE PULSED TITANIUM:SAPPHIRE LASER AND CONDITIONS FOR ITS OPERATION

CROSS-REFERENCE TO RELATED APPLICATION

This application is a continuation-in-part of co-pending application Ser. No. 07/214,419, filed July 1, 1988, by Kenneth W. Kangas, a co-applicant of this application, now U.S. Pat. No. 4,901,322, issued Feb. 13, 1990.

TECHNICAL FIELD

This invention relates to pulsed lasers, and more particularly, to pulsed lasers that produce single longitudinal mode energy over a wide range of wavelengths.

BACKGROUND ART

Tunable pulsed lasers using dye cells as the gain medium and diffraction gratings as the frequency-selective element have been available since the early 1970s. These early lasers, however, had relatively broad linewidths and poor temporal and spatial beam properties, and produced relatively low powers and/or energies. In addition, these early lasers had relatively many parts and were difficult to align. Relevant publications regarding these early developments are *Single mode operation of grazing incidence pulsed dye laser*, Opt. Lett. 3. p. 138 (1978) by M. Littman and *Narrowband operation of a pulsed dye laser without intracavity beam expansion*, J. Appl. Phys., 48,4495 (1977).

It was also discovered that mode-hopping and mode-beating of these tunable pulsed lasers occurred as te laser was tuned over its entire-tuning range. Since output beams that exhibit mode-beating can cause undesirable responses in the materials into which they are introduced, a single longitudinal mode is to be preferred.

It is known that continuous-wave (CW) lasers can operate with very narrow bandwidths. However, to produce pulsed outputs from such lasers, it is necessary to chop the CW output into the desired pulses. The process of chopping the output leads to undesirable inefficiencies and requires complicating circuitry.

Further, it has long been known that gain mediums based on dye cells are very inefficient and relatively short-lived. It has also been known that solid-state gain media are damaged by pump beams whose fluence exceeds a predetermined amount.

It is therefore desirable to have a simple pulsed laser that can produce tunable single-mode outputs over a very broad range of wavelengths at high efficiencies for long periods of time.

DISCLOSURE OF THE INVENTION

It is an object of the present invention to provide a laser that can be tuned over a very broad range of wavelengths.

It is another object of the present invention to provide a laser that can produce an output in a single longitudinal mode over its entire range of wavelengths.

It is yet another object of the present invention to provide a tunable pulsed laser that can operate at greater power outputs than previously attained.

It is a still further object of the present invention to provide a pulsed laser having a durable gain medium.

An additional object of the present invention is to provide a pulsed laser whose gain medium requires little or no maintenance.

Yet another object of the present invention is to provide a laser that can operate within specified conditions which promote the production of a laser output which is characterized by a single longitudinal mode.

An even further object of the present invention is to provide a pumped laser which can produce an output characterized by a single longitudinal mode without the need for high levels of pump power.

According to one aspect, the invention provides a tunable pulsed laser oscillator that comprises an optical cavity and a solid-state gain medium. The optical cavity includes first, second, and third optical element means. The first optical element means receives optical energy along a reflective optical path and reflects the optical energy back along the reflective optical path. The second optical element means diffracts a first portion of the optical energy onto a diffraction axis and a second portion of the optical energy onto an output axis. The third optical element means reflects the optical energy received along the diffraction axis back along the diffraction axis. The solid-state gain medium is located along the reflective optical path between the first optical element means and the second optical element means. The gain medium produces a pulse of optical energy in a substantially single longitudinal mode along the reflective optical path in response to the receipt of a pump beam of energy.

In a preferred embodiment, the third optical element means is movable with respect to the second optical element means, thereby allowing the optical cavity to resonate at a tunable wavelength.

In another preferred embodiment, the gain medium produces a pulse of optical energy in a substantially single longitudinal mode along the reflective optical path in response to the receipt of pump energy. The pump energy is transmitted to the solid-state gain medium in a plurality of component beams, each component beam being directed onto the solid-state gain medium from a distinct direction. In this embodiment, the pump energy has a fluence which is less than a predetermined level.

BRIEF DESCRIPTION OF THE DRAWINGS

FIG. 7 is a graph of the required fracitonal beam walk-off required for a given output coupling reflectivity, for various values of the gain to threshold gain ratio, $\gamma$.

FIGS. 8A, 8B, and 8C illustrate the restricted range of beam sizes and cavity length ratios required to achieve SLM conditions.

FIG. 9 is a graph of experimental results concerning the predicted parametric range for SLM operation.

BEST MODES FOR CARRYING OUT THE INVENTION

Figure 1:
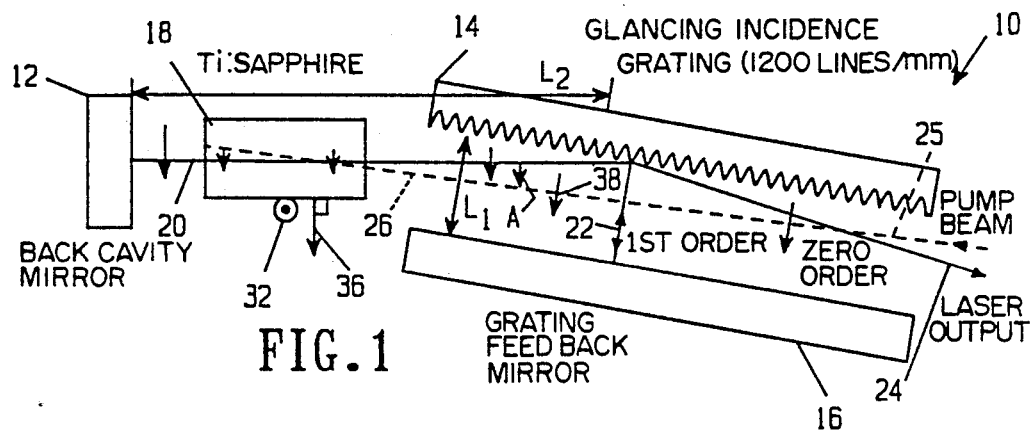
FIG. 1 is schematic diagram of a first embodiment of a solid-state laser system.

FIG. 1 is a schematic diagram of a first embodiment of a solid-state laser system of the present invention. The laser oscillator comprises an optical cavity, generally referred to by numeral 10, including a first optical element 12, such as a back cavity mirror; a second optical element 14, such as a glancing incidence grating; and a third optical element 16, such as a feedback mirror. The second optical element 14 has a normal 15. The laser oscillator also includes a solid-state gain medium 18, which may be a crystalline gain medium such as a titanium:sapphire (Ti:S) crystal.

Figure 5:
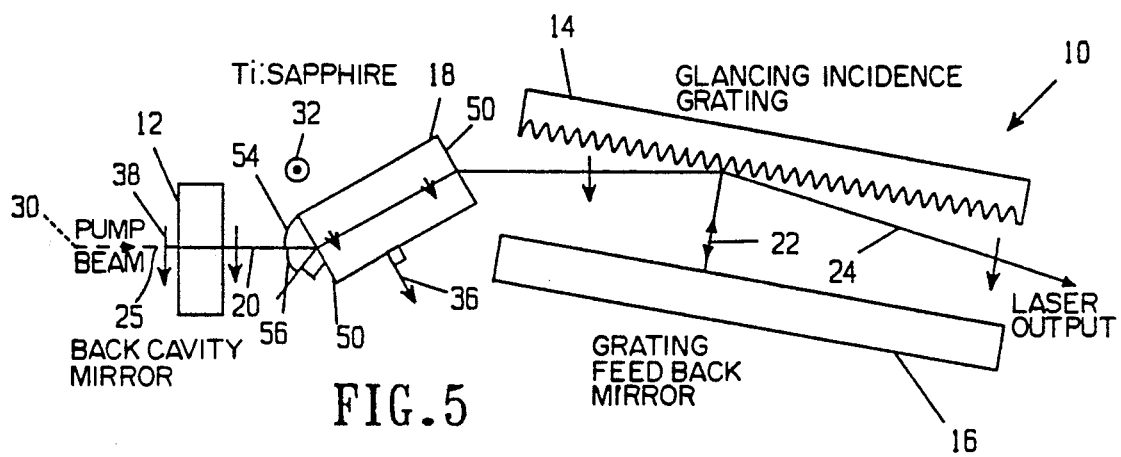
FIG. 5 is schematic diagram of a second embodiment of a solid-state laser system.

The first optical element 12 is placed along a first reflective optical path 20. The optical path 20, which makes a grazing angle, $\alpha$, with the second optical element 14, may be a single axis (as shown in FIG. 1) or a more complicated path (as shown in FIG. 5). The first optical element 12 receives and reflects back optical energy along the first reflective optical path 20. A highly efficient mirror is appropriate for use as the first optical element means 12.

The second optical element 14 diffracts optical energy directed along the first reflective optical path 20. A first portion of the optical energy contained in the laser oscillator is diffracted along a diffraction axis 22 by the first order of interference. The diffraction axis 22 makes an angle $\theta$ with respect to the normal 15 to the second optical element 14. A second portion of the optical energy is reflected along an output axis 24, and is reflected out of the laser oscillator at glancing incidence. Consequently, the output coupling fraction is high (greater than 50) percent) for grazing angles in the 1–2 degrees range. The distinct direction of the diffraction axis 22 is determined both by the angle at which the optical energy is directed toward the second optical element means 14 along the first reflective optical path 20 and by the wavelength of the optical energy.

The third optical element means 16 receives and reflects optical energy along the first diffraction axis 22.

The optical cavity 10 accordingly includes a first path consisting of the first reflective optical axis 20 (between first and second optical elements 12 and 14) and the first diffraction axis 22 (between second and third optical elements 14 and 16). The first path resonates at a wavelength which depends on the path's length. The optical cavity 10 also includes an output energy path consisting of the axes 20 and 24. The wavelength of the optical energy on the output path also depends upon the length of the first path.

The solid-state gain medium 18 is located along the first reflective optical path 20, between the first and second optical elements 12 and 14, and receives energy from a pump beam 25 along a pump beam axis 26 (See FIG. 1). In response to receiving the pump beam 25, the solid-state gain medium 18 produces optical energy along the first reflective optical path 20 at a desired wavelength.

The solid-state gain medium 18 is preferably a crystalline block of titanium:sapphire, which in the present invention, measures approximately 2 centimeters long in the direction of the first reflective optical path 20 and approximately 1 centimeter each in width and height in a plane perpendicular to the first reflective optical path 20.

Although titanium:sapphire has been found to be particularly effective as a solid-state gain medium, other solid-state materials, such as neodymium:YAG and chromium-based crystals, will also work as the gain medium 18. Solid-state gain mediums are particularly advantageous because of one or more of the following: their wider tunability, narrow line widths, high output energy, and longer lives as compared to dye gain mediums.

The efficiency of the solid-state gain medium 18 is converting the pump beam energy into the optical energy at the desired wavelength is affected by the angle A (see FIG. 1) between the pump beam axis 26 and the first reflective optical path 20. The closer these axes are to being parallel, the greater the efficiency of conversion from the pump beam energy into optical energy. The angle $\alpha$ between the pump beam axis 26 and the first reflective optical path 20 is less than approximately 2 degrees. It has been found that whereas in a tunable dye laser, the output energy is as low as a few microJoules, in an equivalent titanium:sapphire gain medium laser, the output is a few milliJoules.

The pump beam 25, which impinges upon the solid-state gain medium 18 along the pump beam axis 26, can be produced by a source (not shown), such as a Nd:YAG laser which operates at 1064 nanometers. Through the use of nonlinear optics, the output of the neodymium:YAG laser is doubled to a wavelength of 532 nanometers, which is within the approximate 480 to 540 nanometer absorption range of the titanium:sapphire crystal. Other pump beams, which are closer to the peak absorption of the titanium:sapphire gain crystal used for the solid-state gain medium 18 (i.e., at approximately 500 nanometers) can be used to further improve the efficiency of the laser oscillator.

The configuration of the present invention has significant outcoupling and cavity losses. These losses require pumping of the titanium:sapphire crystal and can be reduced by using an appropriate pump beam 25. With intense beams having the potential of causing optical damage, it has been found that a pump beam which allows the use of a pulse train to lower peak energies offers the least potential for optical damage. Specifically, increasing the length of the pulse train which creates the pump beam 25 from a few nanoseconds to a few hundred nanoseconds is very effective at improving the life of the solid-state gain medium 18, by reducing the potential for optical damage. For example, the laser pump energy can be supplied in a 250-nanosecond mode-locked gaussian-shaped pulse train consisting of 100-picosecond pulses spaced 10 nanoseconds apart and producing approximate 50 milliJoules at 532 nanometers wavelength. The pulse train was amplified in a Spectra Physics DCR-2A Nd:YAG laser. With this level of pump beam energy, the laser oscillator has been operated to generate between 1 and 2 milliJoules per pulse of single longitudinal mode output energy having a pulse length of 2 to 3 nanoseconds. In a second experiment, the output from an injection seeded, single longitudinal mode Q-switched Spectra Physics DCR-3A is doubled and used directly to pump the Ti:S crystal. In this case, the pump pulse is approximately 5 nanoseconds in duration. The pumping was achieved by focusing the 0.4 centimeter 532 nanometer wavelength beam with a 50 centimeter focal length lens. The pump beam focus occurred near the diffractive element 14. For both pumping geometries, the pump beam diameter in the Ti:S was about 1.2 millimeters, giving a peak pump fluence of up to about 3.5 Joules/cm² with 40 milliJoules of pump energy. Fluence is the total energy content of the pump pulse. Fluence has units of energy per unit area.

The laser oscillator of the present invention can be continuously tuned by rotating the third optical element means 16 with respect to the second optical element means 14 about an axis 32 that is perpendicular to the plane of FIG. 1. This causes the wave length of the resonant optical energy to change in accordance with the wavelength of the diffracted first order of the grating which is, in turn, reflected by the third optical element 16. If the gain medium 18 is a Ti:S crystal, tuning from 700 to 900 nanometers requires a total mirror rotation of 15 degrees. One location of the axis 32, which gives synchronous tuning without mode-hops, is described by Littman and Montgomery in *Grazing Incidence Designs Improve Pulsed Dye Lasers*, Laser Focus 24, pp. 70-86 (Feb. 1988). Using this location, exact tracking of the cavity length and wavelength should be possible, and continuous single longitudinal mode operation over a limited bandwidth should be achieved.

In an experiment where the tuning bandwidth was limited by the optical response of available optics, the laser was found to be continuously tunable over greater than 2500 cm$^{-1}$ from 746 to 886 nanometers. With optics coated to operate over a range of wavelengths between 700 and 1000 nanometers, tuning is expected over this wavelength range. The laser oscillator produced 2 nanosecond pulses, with 2.0 milliJoules per pulse, with a single longitudinal mode output. Its intrinsic efficiency was approximately 10 percent. This, with its output beam quality near TEM$_{00}$, makes this laser oscillator attractive for doubling and mixing applications. The higher energy is due to the much higher saturation fluence level and beam size in Ti:S as compared to dyes.

In the experiment, the Ti:S crystal was made from a boule purchased from Union Carbide several years ago. Consequently, its characteristics are not nearly as good as those that are obtainable at present. The material used had a pump absorption at 532 nanometers of 1 cm$^{-1}$ and a figure of merit of only approximately 15. This corresponds to an absorption loss of about 0.07 cm$^{-1}$ at 800 nanometers. Surface reflections were minimized with a hard antireflection coating at 800 nanometers. Both the back cavity mirror 12 and the tuning mirror 16 were dielectric coated for maximum reflection in the near infrared wavelength around 800 nanometers.

Certain gain media, for example, a solid-state gain medium 18, can be used in the laser oscillator to produce an output exhibiting a single longitudinal mode. In particular, the choice of a crystalline gain medium, such as a Ti:S crystal having an optical axis 36, and causing the pump beam 25 to be polarized (as indicated by polarization arrows 38) in a direction parallel to the crystal's optical axis 36, will cause the gain medium 18 to generate optical energy having substantially a single polarization. This promotes the existence of a single longitudinal mode. This was demonstrated by examining the output of the laser oscillator after its wavelength has been doubled. Using a Hamamatsu SbCs detector and a 10 GHz etalon with a finesse of 25, the presence of a single longitudinal mode could be demonstrated from the temporal output shape and ring structure.

Figure 2A:
FIG. 2A is a graph of the temporal response of a laser system which is producing energy in two longitudinal modes.
Figure 2B:
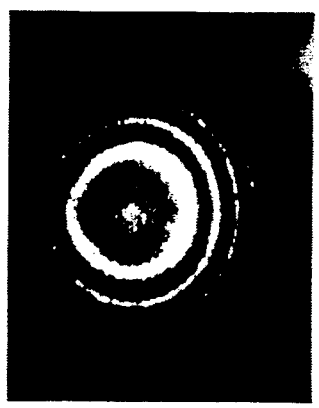

The graph of FIG. 2A and the photograph of FIG. 2B show the temporal response and etalon output of the laser oscillator where the angle of the second optical element 14 is not set to produce a glancing condition between the first reflective optical axis 20 and the output axis 24. In addition, the cavity length, which was 12 centimeters, was not optimized. The result is that the temporal response (shown in FIG. 2A) exhibits oscillatory behavior characteristics of mixed mode operation. This is confirmed by the etalon output (shown in FIG. 2B), which exhibits double-ringed structures.

Figure 3A:
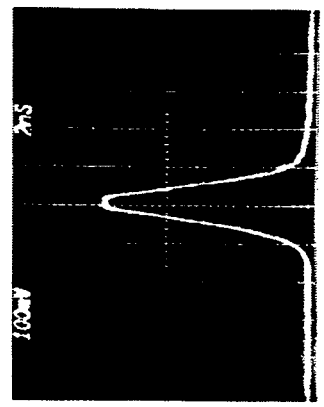
FIG. 3A is a graph of the temporal response of a laser system which is producing energy in a single longitudinal mode.
Figure 3B:
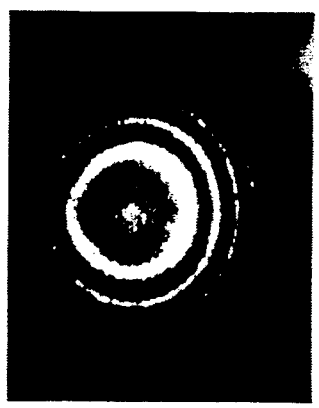
FIG. 3B is a photograph of the etalon output of a laser system which is producing energy in a single longitudinal mode.

When the grating angle is set closer to a glancing condition, the temporal response and ring structures of the output are improved significantly. As shown in the graph of FIG. 3A and the photograph of FIG. 3B, the temporal output exhibits no mode beating and the etalon output (shown in FIG. 3B) exhibits only single-ring structures, indicating single longitudinal mode operation. With the burst of mode locked pulses as the pump beam, the threshold for single longitudinal mode oscillation was approximately 18 milliJoules. Above 40 milliJoules, single longitudinal mode operation ceased.

Single longitudinal mode operation is limited to a narrow range of conditions, which can be predicted using geometrical ray tracing and Gaussian beam propagation concepts. This analysis assumes that the laser oscillator is tuned to a wavelength $\lambda$, so that oscillation occurs along the path 20. For any other wavelength $\lambda' = \lambda + \Delta\lambda$, the oscillation follows a different path than path 20, due to the dispersion of the optical element 14. This produces walk-off within the gain region of the gain medium 18-by an amount $\delta X$ on each round trip in the oscillator. Consequently, those rays which move across the gain region in the gain medium 18 experience lower total gain after N round trips, as opposed to rays at the tuned wavelength $\lambda$. The output intensity after N round trips can be defined as I at wavelength $\lambda$ and as I' at wavelength $\lambda'$. Both intensities are initiated from spontaneous emission in the gain medium 18. The ratio I'/I is a measure of the mode fidelity when $\Delta\lambda$ is taken as the longitudinal mode spacing $\lambda^2/2(L_1+L_2)$, where $L_1$ and $L_2$ make up the total cavity length.

By assuming a spatial gain distribution of width 2x and computing I' and I after each round trip in the cavity, the values of I'/I were predicted. The ratio I'/I is evaluated when the intensity I reaches output flux level (50 mW/cm² for a gain switched oscillator). Values of I'/I less than or equal to 0.05 are taken as sufficient to assure essentially single longitudinal mode operation. For a parabolic gain distribution (taken for convenience), the output intensity ratio after N round trips is approximately $$\log\left(\frac{I'}{I_{start}}\right) \approx \left[N(1-\gamma) + \frac{\gamma}{3}N^2(N-1)\left(\frac{\delta x}{x}\right)^2\right]\log(R),$$

where I' becomes I when x=0. The ratio of gain to threshold gain is designated by $\gamma$ and the output coupling reflectivity by R. While $\delta X$ is different for each round trip in the oscillator and, accordingly, the beam walks off both the gain region of the gain medium 18 and the diffractive optical element 14, for only 5 to 10 round trips, an average value of $\delta x$ can be related to the cavity length, grazing angle of incidence, wavelength, and grating period for cases where the feedback optical element 16 and the diffraction optical element 14 are approximately parallel. The expression (for $\delta x$ measured in millimeters) is:

$$\delta x(mm) = \frac{0.23 \lambda^2(\mu)}{\alpha(\deg)d(\mu)} \left[ \frac{L_2/L_1}{1 + L_2/L_1} \right]$$

Here $\alpha$ is the gazing angle in degrees, and d is the period in microns. Clearly $\delta x$ must be as large as possible to reduce the ratio $I'/I$ and to guarantee single longitudinal mode operation. This requires that $\alpha$ and d are small, and the ratio of length ($L_2/L_1$) must be greater than 1. In a current design, $L_2/L_1$ equals 6, with $L_1 = 1$ centimeter. Clearly, $L_2$ cannot be arbitrarily large due to diffraction effects.

Figure 4:
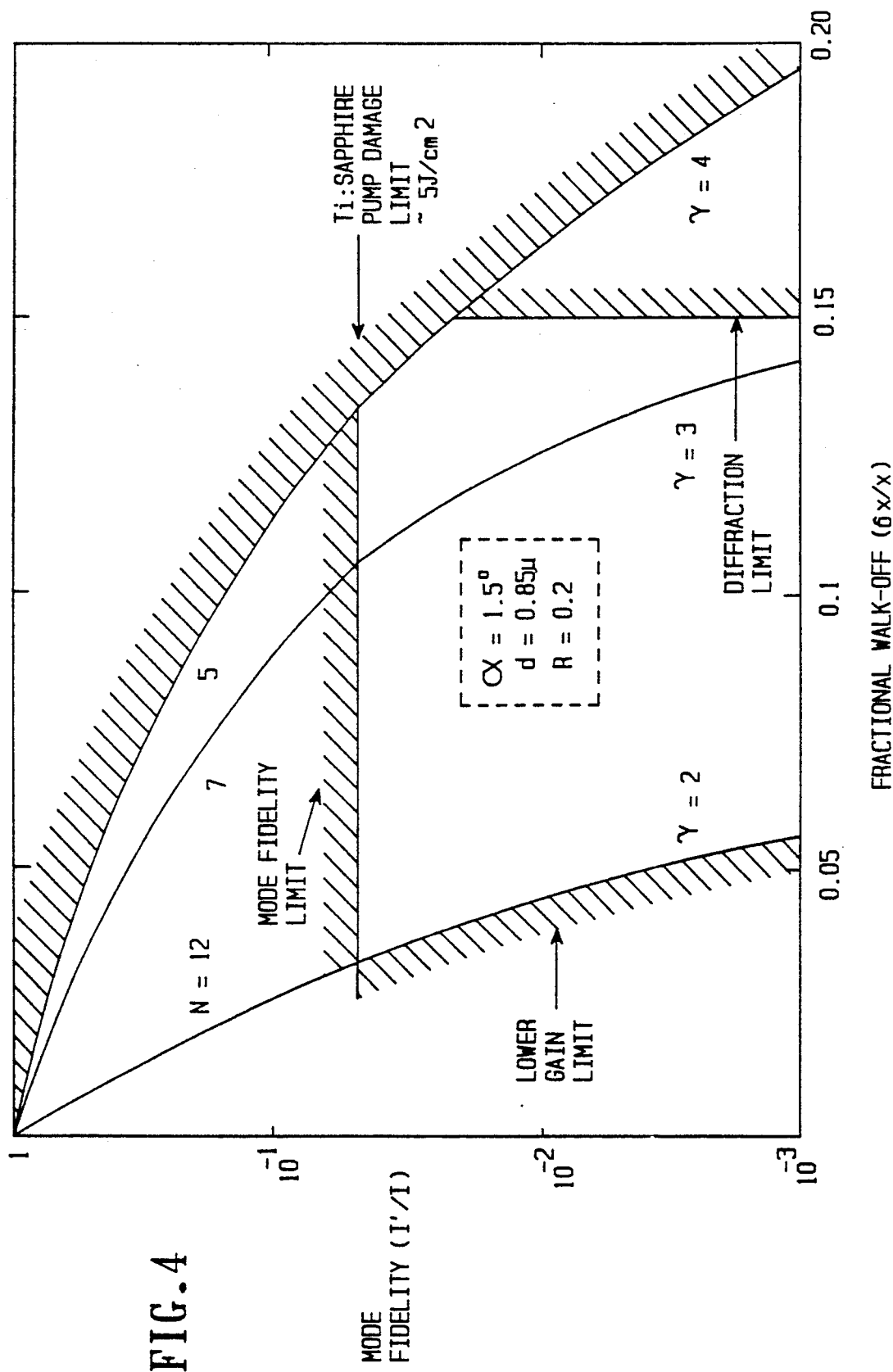
FIG. 4 is a graph of mode fidelity of the laser oscillator of the present invention as a function of fractional walk-off.

Typical values ($\alpha = 1.5$ degrees, $\lambda = 0.8$ microns) lead to $\delta x = 0.1$ to 1.5 millimeters for gratings with 1200-1800 lines per millimeter, respectively. Each curve shown in the graph of FIG. 4 is for a different gain, $\gamma$, and number of cavity round trips to reach output intensities. The results show a very limited range of gain and ($\delta x/x$) over which single longitudinal mode operation is possible. Increasing the gain requires large values of ($\delta x/x$) to maintain the same mode fidelity and lowering the gain below twice threshold leads to unstable operation.

Further, diffraction limits the maximum value of $L_2$ and ($\delta x/x$). For example, the diffraction-induced angular ray errors after N cavity round trips $\beta_N$ must be less than the angular shifts $\Delta\alpha$ induced by the diffraction optical element 14 for adjacent longitudinal modes. The diffraction-induced angular errors can be estimated using the Gaussian beam propagation equation. For a beam within its Rayleigh range, the angular ray errors are given by the approximate relationship $$\beta_n \approx 2(L_1+L_2)\lambda^2 N/\pi^2 x^3.$$

From the cavity geometrical ray tracing it can be shown that $$\Delta\alpha \approx \Delta\lambda/\alpha d = \lambda^2/2\alpha d(L_1+L_2).$$

Setting $\beta N$ less than $\Delta\alpha$ gives the upper limit on $L_2$ as $$(L_1 + L_2) \leq \frac{\pi}{2} \frac{x^{3/2}}{(d\alpha N)^{1/2}}$$

This result can be combined with the walk-off expression above to set an upper bound on ($\delta x/x$) of $$\left( \frac{\delta x}{x} \right) \leq \frac{2.6 \lambda^2(\mu)}{N^{1/3}} \left( \frac{1}{[\alpha(\deg)d(\mu)]^4} \cdot \frac{L_2^3}{[L_1 + L_2]^5} \right)^{1/3}.$$

For the conditions required for the oscillator to work as desired, ($\delta x/x$) must be less than approximately 0.15 when $L_2 = 6$ centimeters. For larger values of $L_2$, the limit is even lower. This occurs because x must be increased as the cavity length grows in order to minimize diffraction spreading.

The combined effects of diffraction (forcing a larger beam size) and beam walkoff restricts the beam diameter. This beam size restriction, coupled with a saturation fluence for Ti:S limit the single longitudinal mode oscillator output to approximately 1-10 milliJoules. Other solid state materials will have different limits. Additionally, the damage fluence for Ti:S, approximately 5 to 10 $J/cm^2$ for laser pumping, sets a limit upon the gain, as shown in FIG. 4.

It is important to note that other solid-state materials, such as alexandrite and Nd:xxx may also be used in this oscillator configuration. (xxx can be glass or other crystalline hosts such as YAG.) However, gain-length products greater than 2 must be achievable in order to sustain oscillation with the high output coupling of the grazing incidence grating.

The foregoing was discussed by K. Kangas, D. D. Lowenthal, and C. H. Muller II, in *Single Longitudinal mode, tunable, pulsed titanium:sapphire laser oscillator*, Opt. Lett. 14,21 (1989). At the time of the publication, However, the phenomenon of walk-off and its effects as related to single longitudinal mode operation were not well understood. Since then, a better understanding of these phenomena has been developed. Single longitudinal mode operation is limited to a narrow range of conditions, which can be predicted using geometrical ray tracing and Gaussian beam propagation concepts. The SLM, pulsed, Ti sapphire oscillator sensitivity to these conditions was discussed briefly in the above-mentioned publication.

The achievement of narrow bandwidth, SLM, operation is not possible without carefully choosing the cavity condition. In particular, the ratio, $\gamma$, of gain g to threshold gain $g_{th}$ and the pump beam size are critical; these must be set within a narrow range of values. To illustrate this property of the SLM, pulsed, titanium:sapphire oscillator it is necessary to examine the oscillator start-up time, the grating induced beam walk-off of unwanted wavelengths, and the impact of beam diffraction effects.

OSCILLATOR START-UP TIME

The oscillator start-up time is determined by the number of cavity round trips, N, to reach the peak output intensity, $I_{out}$. For a standing wave oscillator cavity of length, L, and gain $g = g_{th}\gamma$, the output intensity can be expressed as $$\frac{I_{out}}{I_{start}} = \left[ \frac{1 - R}{R} \right][RT]^{N(1-\gamma)} \tag{1}$$

where R is the output mirror reflectivity, T is the cavity's round trip transmission factor accounting for cavity losses, $g_{th}$ is the threshold gain, and $I_{start}$ is the background flux, within the cavity bandwidth, from which oscillation grows. Equation (1) assumes that there is not appreciable gain saturation, and this is correct for the SLM, pulsed, titanium:sapphire oscillator, where the extraction efficiency is less than 10 percent. Solving Equation (1) for N gives $$N = \left[ \frac{1}{\gamma - 1} \right] \frac{\ln\left[ \frac{R}{1 - R} \left[ \frac{I_{out}}{I_{start}} \right] \right]}{\ln[RT]}$$

This equation gives the number of round trips to reach peak output intensities for a single wavelength, $\lambda_0$, that satisfies the grating equation $$\cos \alpha + \sin \theta \frac{\lambda_0}{d} \qquad (2)$$

For other wavelengths, $\lambda = \lambda_0 + \Delta\lambda$, the grating dispersion causes the beam to walk across the width of the gain medium by an amount $\delta\omega$ on each cavity round trip. Consequently, these wavelengths will experience a lower total gain, after N cavity trips.

The amount of walk-off possible is proportional to $\Delta\lambda$ and can be obtained from the grating equation (2). Equation (1) can be rewritten to take account of walk-off when the wavelength is different from $\lambda_O$. A good approximation is $$\frac{I_{out}}{I_{start}} \approx \left[\frac{1-R}{R}\right](RT)^{N(1-\gamma)}\left[1 - \frac{N\delta\omega}{2\omega_o}\right] \qquad (3)$$

where $\delta\omega$ is the beam walk-off per cavity round trip and $2\omega_o$ is the beam full width of the beam between its $1/e^2$ intensity points. Comparing Equations (1) and (3), it is clear that a requirement for excluding wavelengths different from $\lambda_0$ is $$\frac{\delta\omega}{2\omega_o} \geq \frac{1}{N} \qquad (4)$$

The walk-off phenomenon will be discussed more fully subsequently.

FIGS. 7 and 8A–C summarize the range of operating parameters that allow SLM operation of a pulsed, titanium:sapphire oscillator used in a grazing incidence grating cavity configuration such as that shown in FIG. 1. Similar figures can be produced for other grazing incidence grating cavity configurations and for other gain media, and especially for other solid-state gain media. The cavity grating allows a single wavelength, $\lambda_0$, to oscillate in the cavity without suffering beam walk-off across the titanium:sapphire gain region of width $2\omega_0$. All other wavelengths suffer a beam deflection, $\delta\omega$, on each cavity round trip. This depends on the grazing angle, grating line spacing and wavelength shift from $\lambda_0$. The amount of walk-off determines the ability of the oscillator to eliminate unwanted wavelengths on adjacent longitudinal modes.

FIG. 7 is a graph of the fractional walk-off, $\delta\omega/2\omega_o$ required on each cavity round trip to insure SLM operation for a particular round trip transmission factor, with $\gamma$ as a parameter. The number of cavity round trips, N, is tabulated on the right vertical axis through its connection to $(\delta\omega/\omega_o)$, as given in Equation (4). A value of $I_{out}/I_{start}$ was taken as $10^8$ which agrees with experimental results. As $\gamma$ increases, the fractional walk-off required increases because it takes fewer cavity round trips to reach output intensity levels. When $\gamma$ exceeds approximately 1.5 it becomes impossible to limit operation of the oscillator to a single longitudinal mode. As a result we normally choose to work with $\gamma$ in the range from 1.2 to 1.5. We also choose the angle $\alpha$ to produce a value of R in the range from 0.2 to 0.35. This defined a preferred operating region 60, as shown in FIG. 7. Lowering $\gamma$ below this range leads to increased adjacent mode discrimination, but the output energy per pulse is reduced, start-up times and start-up timing jitter is increased, and the oscillator tends to be very unstable. Improved performance could be achieved by setting the output coupling mirror reflectivity R to higher values such as approximately 0.5. In this case, the gain could be set high, $\gamma > 1.5$, and the required walk-off for SLM operation would not be excessive. Unfortunately, the output coupling reflectivity is determined by the grating and the grazing angle. To achieve higher values of R it is necessary to move to larger grazing angles that reduce the ability of the oscillator to discriminate against adjacent longitudinal modes. A solution to this problem is to develop a blazed that has high first order efficiency at grazing angles of incidence.

As an example of the use of FIG. 7 for an SLM, pulsed, titanium:sapphire oscillator, with an output coupling mirror reflectivity of 0.3, the fractional walk-off per round trip must be $\geq 0.035$ when $\gamma$ is 1.5. Also, the number of cavity round trips required to reach peak output intensity is approximately 30. With $\gamma = 1.5$, and a cavity length of 5 cm, the measured start-up time is approximately 30 cavity round trips. Alternatively, graphs such as that shown in FIG. 7 provide a means for determining the effective output coupling of the grazing incidents grating cavity. By measuring $\gamma$ and the start-up time (determined by the number of cavity round trips), it is possible to obtain the cavity output coupling reflectivity and the walk-off, $\delta\omega/2\omega_o$, required to exclude unwanted wavelengths.

GRATING INDUCED BEAM WALK-OFF AND GRATING BANDWIDTH ACCEPTANCE

The amount of walk-off induced by the grating of an oscillator such as that shown in FIG. 7 can be determined from the grating equation, equation (2), and depends on the wavelength change from $\lambda_0$, the grating line spacing, and the grazing angle $\alpha$. An exact calculation of the walk-off requires detailed ray tracing of the oscillator cavity and is a tedious process. To simply characterize the walk-off achievable it is appropriate to note that changes in the angle $\theta$ are very minor compared to changes in the grazing angle $\alpha$, as the walk-off progresses. In fact, for grazing angles near 1.0 degree, the change in $\alpha$ is 10–50 times larger than the change in $\theta$. Consequently, it is possible to hole $\theta$ fixed in the following first order analysis, and find that changes in $\alpha$ on each cavity round trip are given by $$\Delta\alpha \approx -\frac{2(\Delta\lambda)}{\alpha d}. \qquad (5)$$

Equation (5) is developed by differentiating the grating equation while holding $\theta_m$ constant. The walk-off of the beam within the titanium:sapphire gain medium is approximately $\Delta\alpha L_2/2$, per cavity round trip, or $$\delta\omega = \frac{1}{\alpha d}(\Delta\lambda)L_2. \qquad (6)$$

An actual ray trace shows that $\Delta\alpha$ increases on each cavity round trip. However, the beam walks across the grating such that the length $L_2$ decreases while maintaining a nearly constant product of $\Delta\alpha L_2$.

To achieve adequate discrimination against the wavelength $\lambda = \lambda_0 + \Delta\lambda$, we require $\delta\omega/2\omega_o \geq 1/N$, equation (4), must be satisfied. This implies that the half width of the wavelength acceptance, set by the grating, is approximately $$(\Delta\lambda)_G \approx \frac{\alpha d(2\omega_0)}{NL_2} \quad (7)$$

As an example, take $\alpha=1$ degree, $d=0.67\times 10^{-4}$ ecm, $2\omega_0=0.5$ mm, $N=30$, and $L_2=5$ cm. Then, the half width of the wavelength acceptance for the grazing of incidence grating cavity is approximately 0.05 cm$^{-1}$ or 1.5 GHz with a wavelength of 0.8 microns. The actual bandwidth of the laser is narrower than this because of the cavity etalon effects, but to discriminate against adjacent longitudinal modes the laser cavity mode spacing should be greater than $(\Delta\lambda)_G$, $$(\Delta\lambda)_M \geq (\Delta\lambda)_G \quad (8)$$

$$(\Delta\lambda)_M = \frac{\lambda^2}{2(L_1 + L_2)} \quad (9)$$

At $\lambda=0.8$ micron and a cavity length of 5 cm, we have $(\Delta\lambda)_M = 0.06$ cm$^{-1}$ or approximately 1.8 GHz. Consequently, this cavity example can strongly discriminate against unwanted adjacent longitudinal modes.

It is clear from Equation (7) that there is a limit on the beam size, $2\omega_0$. Making $2\omega_0$ larger increases the bandwidth acceptance of the grating and, consequently, discrimination against adjacent longitudinal modes is less effective. The limit can be expressed in an alternative format. Starting with Equation (6) and substituting $(\Delta\lambda)_M$ for $\Delta\lambda$ we have $$\delta\omega = \frac{\lambda^2}{2\alpha d}\left[\frac{L_2/L_1}{1 + L_2/L_1}\right] \quad (10)$$

Combining Equation (10) with Equation (4) leads to the desired limit on the beam diameter:

$$2\omega_0 \leq \frac{N\lambda^2}{2\alpha d}\left[\frac{L_2/L_1}{1 + L_2/L_1}\right] \quad (11)$$

BEAM DIFFRACTION EFFECTS

Diffraction effects also set a limit on beam size. In this case the limit is a lower bound. If the beam is too small diffraction will introduce angular errors that are greater than the grating induced angular shifts, $\Delta\alpha$. In this case, the desired beam at $\lambda_0$ will suffer diffraction grating induced losses equivalent to that for the unwanted adjacent longitudinal modes. The result is a loss of longitudinal mode discrimination and multi-mode oscillation. The diffraction angles in the cavity depend on the beam size, the total optical path length after N cavity round trips, and the Rayleigh range. For a 1 mm beam and a wavelength of 0.8 micron, the Rayleigh range is 100 cm. For a cavity length of 5 cm and 30 cavity round trips the optical path is approximately 300 cm. As a result, we take the diffraction induced angular errors, $(\Delta\alpha)_{Diff}$, to be $\lambda_0/\pi\omega_0$ and require $$\lambda/\pi\omega_0 < 2(\Delta\alpha)_{Grating} \approx \frac{2\lambda_0^2}{\alpha d}\left[\frac{1}{L_1 + L_2}\right] \quad (12)$$

or $$2\omega_0 > \frac{\alpha dL_1(1 + L_1/L_2)}{\pi\lambda_0}$$

This result along with Equation (1) sets the operating bounds on the SLM, pulsed, titanium:sapphire, grazing incidence grating cavity, oscillator.

FIGS. 8A-C illustrate the restricted range of beam sizes, $2\omega_0$, and cavity length radio $L_2/L_1$, in order to achieve SLM conditions. These plots are complementary to FIG. 7. Here, in FIGS. 8A-C, the number of cavity round trips, N, has been fixed at approximately 30 because this is a typical operating condition for the gain, $\gamma$, in the range of 1.2 to 1.5 and the grating driven output coupling mirror reflectively of between 0.2 and 0.3. The trends are clear and show that the range of operating parameters becomes very narrow as the wavelength is reduced. Some improvements at these shorter wavelengths can be realized by increasing the number of cavity round trips. This can be done by lowering the gain, $\gamma$, to less than 1.3 or by finding gratings with increased output coupling reflectivities for the grazing incidence conditions used here.

FIGS. 8A, 8B and 8C illustrate the narrow range of operating parameters that must be maintained if SLM operation is to be achieved. Clearly, operation at large wavelengths leads to the widest range of acceptable parameters. This is due to the wider wavelength spacing, between adjacent longitudinal modes. As a result, SLM operation at larger wavelengths tends to be more stable with less critical cavity settings. On the other hand, shorter wavelengths squeeze the operating parameters into a very narrow range of acceptability. The beam diameter must be set to within a few tenths of a millimeter to maintain SLM operation.

FIG. 9 is a graph of experimental results concerning the predicted parametric range for SLM operation. Under the experimental conditions shown in FIG. 9, the grazing angle $\alpha$ was set at 1.5 degrees so that there is less walk-off than is possible in FIGS. 8A-C. Nevertheless, good SLM operation is achieved by lowering the gain; here $\gamma=1.2$ and the number of cavity round trips to reach output intensities is 60 to 70. With the larger number of round trips good discrimination against adjacent longitudinal modes is maintained. In these experiments the beam size was varied as shown in FIGS. 8A-C. Marginal SLM operation is observed as the beam size approaches the limits set by walk-off and diffraction effects.

This analysis assumes that the laser oscillator is tuned to a wavelength $\gamma$, so that oscillation occurs along the path 20. For any other wavelength $\gamma'=\gamma_0+\Delta\gamma$, the oscillation follows a different path than path 20 due to the dispersion of the optical element 14. This produces walk-off within the gain region of the gain medium 18—by an amount $\delta\omega$ on each round trip in the oscillator. Consequently, those rays which move across the gain region in the gain medium 18 experience lower total gain after N round trips, as opposed in rays at the tuned wavelength $\gamma$. The output intensity after N round trips can be defined as I at wavelength $\gamma$ and as I' at wavelength $\gamma'$. Both intensities are initiated from spontaneous emission in the gain medium 18. The ratio I'/I is a measure of the mode fidelity when $\Delta\gamma$ is taken as the longitudinal mode spacing $\lambda^2/2(L_1+L_2)$, where $L_1$ and $L_2$ make up the total cavity length.

Other embodiments of a solid-state lower system are also possible. These embodiments can be directed toward further improving the efficiency of the solid-state gain medium 18 by causing the pump and the first reflective optical path 20 to be essentially colinear. As shown in the schematic diagram of FIG. 5, such an embodiment can consist of the same components as described for the embodiment of FIG. 1. There are two major differences between the embodiments of FIGS. 1 and 5. One difference is that the pump beam energy for the laser oscillator shown in FIG. 5 reaches the solid-state gain medium 18 (by passing through the first optical element 12) along a pump beam axis 30, which is coincident with the first reflective optical path 20. The energy from the pump beam passes through the first optical element 12 into the solid-state gain medium 18, where it generates optical energy at the desired wavelength but at a higher efficiency. The other major difference is that the gain medium 18 is a solid-state material oriented to have two Brewster faces 50 and 52, whose angles depend upon the index of refraction of the material making up the gain medium 18, in accordance with the well-known Brewster angle relationship. As shown in FIG. 5, the angle 54 is approximately 30 degrees, while the angle 56, between the normal to the face 50 and the optical path 20 is approximately 60 degrees.

Figure 6:
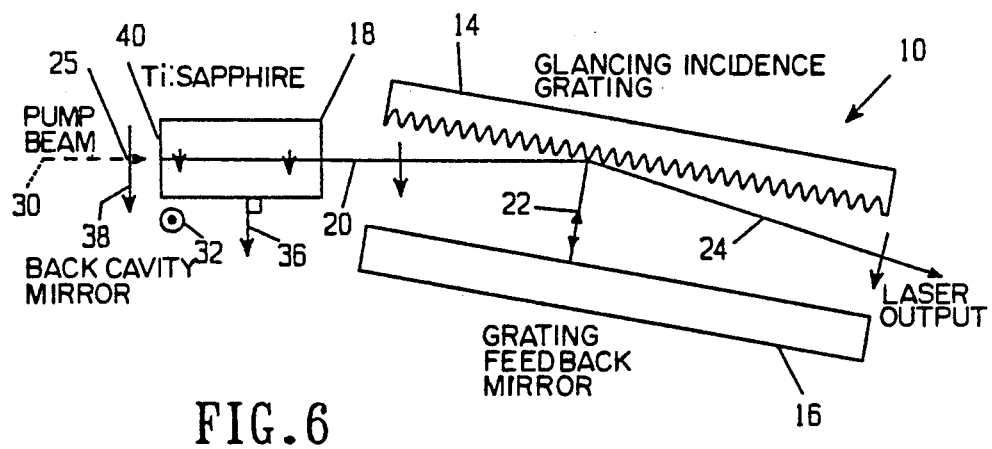
FIG. 6 is schematic diagram of a third embodiment of a solid-state laser system.

A third embodiment of a solid-state laser system is shown in FIG. 6. In this oscillator, the first optical element 12 takes the form of a reflective coating 40 (such as a dichroic coating) on the surface of the solid-state gain medium 18 that defines an outer end of the optical cavity 10 along the first reflective optical axis 20.

Figure 10:
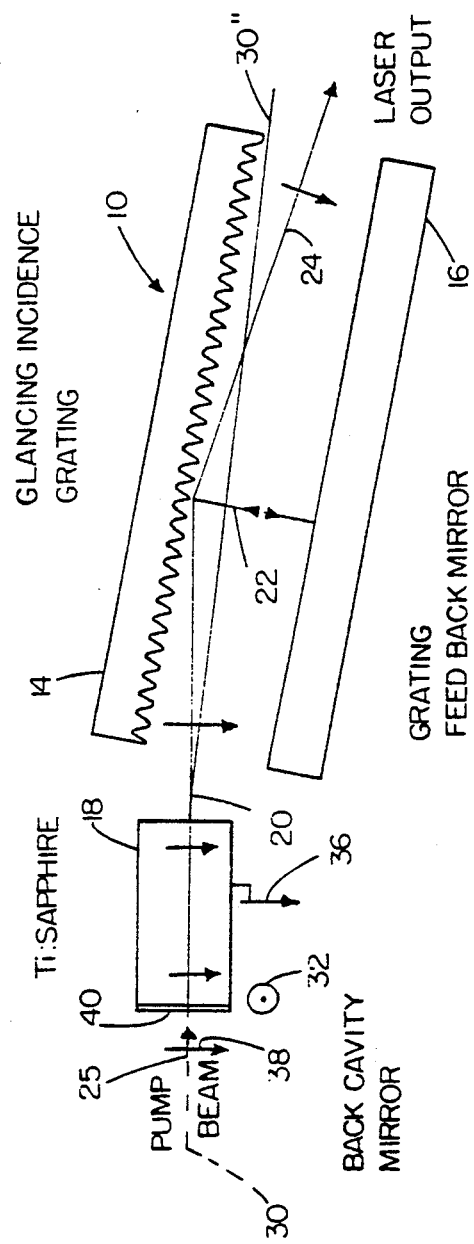
FIG. 10 is schematic diagram of an embodiment of the present invention.

FIG. 10 is schematic diagram of an embodiment of the present invention. Solid-state gain media are sensitive to the magnitude of the fluence of the pump beam. For example, titanium:sapphire gain media experience damage at pump fluence levels in excess of about 10 Joules/cm$^2$. It has been discovered that substantially lower pump fluences can be used in pumped lasers of the type discussed in the foregoing, since both ends of the gain medium 18 are available to the pump beam. In this case, the pump beam 30 is comprised of two components, 30' and 30". Pump beam component 30' is directed onto the gain medium 18 through the reflective coating 40, while pump beam component 30" is directed onto the gain medium 18 by passing between the second optical element 14 and the third optical element 16. Because the pump beam energy can be directed from more than one source, it is either possible to reduce the intensity of either of the pump beam components, or to increase the pump power directed onto the gain medium 18.

As indicated above, detailed illustrative embodiments are disclosed herein. However, other systems, which may be detailed rather differently from the disclosed embodiments, are possible. Consequently, the specific structural and functional details disclosed herein are merely representative; yet in that regard they are deemed to afford the best embodiments for purposes of disclosure and to provide a basis for the claims herein, which define the scope of the present invention.

We claim:

1. A tunable oscillator, comprising:
   an optical cavity, including
   first optical element means for receiving optical energy along a reflective optical path and reflecting said optical energy along said reflective optical path,
   second optical element means for diffracting a first portion of said optical energy onto a diffraction axis and a second portion of said optical energy an output axis, and
   third optical element means for reflecting optical energy received along said diffraction axis back along said diffraction axis; and
   a solid-state gain medium located along said reflective optical axis between said first optical element means and said second optical element means, said gain medium producing a pulse of optical energy in a substantially single longitudinal mode along said reflective optical path in response to the receipt of pump energy, said pump energy being transmitted to said solid-state gain medium in a plurality of component beams, each said component beam being directed onto said solid-state gain medium from a distinct direction,
   whereby a first portion of said optical energy is retained in said optical cavity by being diffracted along said diffraction axis and a second portion of said optical energy is produced by said oscillator by being diffracted along said output axis, said pump energy having a fluence which is less than a predetermined level.

2. The tunable pulsed laser oscillator of claim 1 wherein said third optical element means is movable with respect to said second optical element means, whereby allowing said optical cavity to resonate at a tunable wavelength.

3. The tunable pulsed laser oscillator of claim 1 wherein said gain medium has first and second opposed sides, said reflective optical path intersecting said sides.

4. The tunable pulsed laser oscillator of claim 3 wherein said first and second opposed sides have antireflective coatings.

5. The tunable pulsed laser oscillator of claim 3 wherein said first and second opposed sides are substantially at Brewster's angle with respect to said reflective optical path.

* * * * *

UNITED STATES PATENT AND TRADEMARK OFFICE
CERTIFICATE OF CORRECTION

PATENT NO. : 5,081,630
DATED : January 14, 1992
INVENTOR(S) : Dennis D. Lowenthal et al.

It is certified that error appears in the above-identified patent and that said Letters Patent is hereby corrected as shown below:

At column 14, claim 2, line 43, please delete "whereby" and substitute therefor -- thereby --.

Signed and Sealed this

Eighteenth Day of May, 1993

Attest:

MICHAEL K. KIRK

Attesting Officer

Acting Commissioner of Patents and Trademarks